Figure 1:
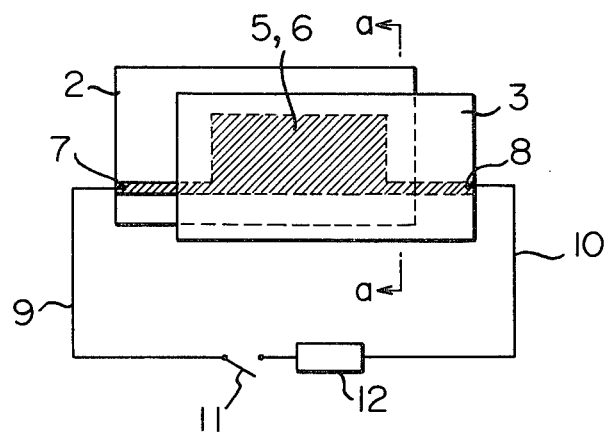

United States Patent [19]

Morinaka et al.

[11] 4,304,683
[45] Dec. 8, 1981

[54] COMPOSITION FOR LIQUID CRYSTAL COLOR DISPLAY ELEMENT

[75] Inventors: Ryoichi Morinaka; Ryoichi Tukahara; Tsutomu Nishizawa; Tuneo Hidaka, all of Ohmuta, Japan

[73] Assignee: Mitsui Toatsu Chemicals, Inc., Tokyo, Japan

[21] Appl. No.: 128,713

[22] Filed: Mar. 10, 1980

[30] Foreign Application Priority Data

Mar. 16, 1979 [JP] Japan .................. 54-30057
May 22, 1979 [JP] Japan .................. 54-62233
May 22, 1979 [JP] Japan .................. 54-62234
Jun. 27, 1979 [JP] Japan .................. 54-80110
Jan. 17, 1980 [JP] Japan .................. 55-3099

[51] Int. Cl.³ .................. G02F 1/13; C09K 3/34
[52] U.S. Cl. .................. 252/299.1; 252/408; 260/383; 350/349; 350/350 R
[58] Field of Search .................. 260/383; 252/299, 408, 252/299.1; 350/346, 349, 350 R

[56] References Cited

U.S. PATENT DOCUMENTS

| | | | |
|---|---|---|---|
| 3,549,667 | 12/1976 | Wunderlich et al. | 260/383 |
| 3,669,994 | 6/1972 | Harvey et al. | 260/383 |
| 3,960,751 | 6/1976 | Moriyama et al. | 252/299 |
| 4,232,949 | 11/1980 | Huffman | 252/299.1 |
| 4,232,950 | 11/1980 | Benham | 252/299.1 |

FOREIGN PATENT DOCUMENTS

| | | | |
|---|---|---|---|
| 2104 | 5/1979 | European Pat. Off. | 252/299 |
| 2920730 | 11/1979 | Fed. Rep. of Germany | 252/299 |
| 48-67566 | 9/1973 | Japan | 260/383 |
| 54-126059 | 9/1979 | Japan | 252/299 |
| 2037803 | 7/1980 | United Kingdom | 252/299.1 |

OTHER PUBLICATIONS

Constant, J., et al., "Photostable Anthraquinone Pleochroic Dyes", Presented at 7th Internat'l. Liq. Cryst. Conf., Bordeaux, Fr. (Aug. 1978).

*Primary Examiner*—Teddy S. Gron
*Attorney, Agent, or Firm*—Fisher, Christen & Sabol

[57] ABSTRACT

A composition for nematic liquid crystal color display elements, said composition comprising at least one anthraquinonic dye represented by the formula

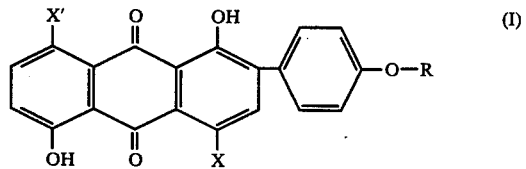

wherein X and X' are the same and represent $-NH_2$ or $-OH$, and R represents a linear or branched alkyl group having 1 to 15 carbon atoms, a cyclohexyl group or a group of the formula $-R_2-O-R_3$ in which $R_2$ is an alkylene group having 1 to 3 carbon atoms and $R_3$ is a linear or branched alkyl group having 1 to 15 carbon atoms dissolved in at least one nematic liquid crystal.

8 Claims, 2 Drawing Figures

COMPOSITION FOR LIQUID CRYSTAL COLOR DISPLAY ELEMENT

This invention relates to a composition for a liquid crystal color display element utilizing an electro-optical effect, comprising a nematic liquid crystal and a dichroic dye. More specifically, this invention relates to a composition for nematic liquid crystal color display elements, comprising at least one nematic liquid crystal and at least one dichroic anthraquinonic dye dissolved therein, sadi dye being represented by the following formula

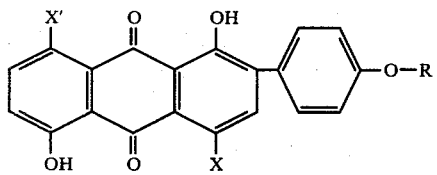

wherein X and X' are the same and represent —NH$_2$ or —OH, and R represents a linear or branched alkyl group having 1 to 15 carbon atoms, a cyclohexyl group or a group of the formula —R$_2$—O—R$_3$ in which R$_2$ is an alkylene group having 1 to 3 carbon atoms and R$_3$ is a linear or branched alkyl group having 1 to 15 carbon atoms, preferably at least one dichroic anthraquinonic dye represented by the following formula

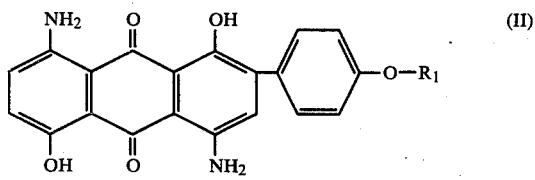

wherein R$_1$ represents a linear or branched alkyl group having 5 to 15 carbon atoms, which composition is used in display devices that operate by the electro-optical effect of nematic liquid crystals.

Liquid crystal display devices containing dichroic dyes have already been known as "guest-host" mode display devices in the field of liquid crystal technology, and are utilized as display devices in watches, portable electronics calculators, televisions, etc.

This type of display device is based on the theory that the orientation of dichroic dye molecules follows that of molecules of a liquid crystalline material. Specifically, the liquid crystal molecules change from an "off" state to an "on" state and are oriented upon the application of an external stimulation which is normally an electric field, and incident to this, dichroic dye molecules are simultaneously oriented. As a result, the degrees of absorption of light by the dye molecules in the two states change to bring about a color display.

Such an electro-optical effect means a liquid crystal color display utilizing the so-called guest-host effect. The guest-host mode is presently operated by a method which involves the use of nematic liquid crystals having positive or negative dielectric anisotropy and a method which involves the use of liquid crystals that show phase transition from a cholesteric phase to a nematic phase upon the application of an electric field.

Some dichroic dyes which operate in accordance with this theory have been known heretofore, but none of them have proved to be entirely satisfactory in their performance in commercial applications. This has partly hampered the development and commercialization of liquid crystal color display devices based on this theory.

Dichroic dyes used in liquid crystal color display devices based on this theory must meet certain basic requirements. For example, they are generally required to have a sufficient coloring ability in small amounts, a high dichroic ratio that enables them to show a high contrast by application of voltage or absence of voltage, sufficient solubility in liquid crystals, excellent durability and high stability. Additionally, they should not deteriorate the performance of the device even when used for a long period of time.

The present invention provides anthraquinonic dyes of formula (I) or (II) as dichroic dyes which meet these requirements.

The anthraquinonic dyes of formula (I) or (II) can be produced by various methods exemplified below.

(1) a method which comprises reacting 1,5-dihydroxy-4,8-diamino-anthraquinone-2,6-disulfonic acid (called Alizarin Saphirol B) with an alkoxyphenyl compound of the formula

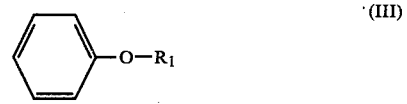

wherein R$_1$ is as defined hereinabove, in sulfuric acid in the presence of boric acid, saponifying the borate ester group, and thereafter desulfonating the product.

(2) A method which comprises reacting quinoneimine of 1,5-diamino-4,8-dihydroxy-anthraquinone with the compound of formula (III).

(3) A method which comprises reacting 1,5-dihydroxy-4,8-dinitro-anthraquinone with the compound of formula (III) in the presence of boric acid and an acidic condensing agent, saponifying the boric ester group and thereafter reducing the nitro groups of the thus obtained compound to amino groups. In this method, the reaction between the boric ester of 1,5-dihydroxy-4,8-dinitro-anthraquinone and the alkoxyphenyl compound is carried out preferably at low temperatures. Advantageously, it is performed at a temperature of 0° C. or below. The acidic condensing agent used is selected such that phenyl substitution may be effected completely. In particular, sulfuric acid of various concentrations can be used in view of its economical advantage. Other usable solvents include, phosphoric acid, acetic acid, and other organic solvents. Sometimes, mixtures of these solvents are preferably used. The alkoxyphenyl compound is synthesized by reacting phenol and an alkyl halide, etc. in the presence of a base. Advantageously, the boric acid ester of 1,5-dihydroxy-4,8-dinitro-anthraquinone and the alkoxyphenyl compound are used in equimolar proportions, or the alkoxyphenyl compound is used in slight excess. By pouring the resulting reaction mixture over ice, the boric ester is partly saponified. For complete saponification, the aqueous suspension is generally boiled. The resulting anthraquinone compound having its 2-position substituted by a phenylene group can be easily converted to a blue dye having amino groups by reducing the remaining nitro groups. The compounds of formula (II)

obtained by this method are dyes which have an especially good dichroic ratio.

(4) A method which comprises reacting a 2-4'-hydroxyphenylanthraquinone derivative obtained by the methods (1) to (3) using phenol instead of the compound of formula (III), with an alkyl halide of the formula $$R_2-Hal \qquad (IV)$$

wherein $R_2$ represents an optionally branched alkyl group having 1 to 15 carbon atoms or a cyclohexyl group, and Hal represents a halogen atom, or a tosyl ester of the formula $$R_2-O-T_s \qquad (V)$$

wherein $R_2$ is as defined above, and $T_s$ represents a tosyl residue, in the absence or presence of a basic catalyst.

(5) A method which comprises reacting 1,5-dihydroxy-4,8-diamino-anthraquinone-disulfonic acid (Alizarin Saphirol B) with the compound of formula (III) in sulfuric acid in the presence of boric acid, reacting the product with a reducing agent such as sodium hydrosulfite to split off the sulfone group, hydrolyzing the resulting product to convert the amino groups to hydrozyl groups, and oxidizing the resulting leuco derivative of tetrahydroxyanthraquinone of formula (I) in a known manner.

Since the crude dyes obtained by the aforesaid methods frequently contain inorganic salts and other impurities, they have to be purified by extraction or recrystallization with organic solvents, preferably by thin-layer chromatography or column chromatography.

The anthraquinonic dyes (I) in accordance with this invention color liquid crystals in brilliant desirable blue or red colors which cannot be attained by conventional dichroic dyes, and have a markedly high dichroic ratio (contrast) and excellent light fastness.

Typical examples of the anthraquinonic dyes (I) are shown in Tables 1 and 2.

TABLE 1

| Dye No. | Structural formula | Color in toluene solution |
|---|---|---|
| 1 | H₂N, O, OH, anthraquinone with –O–(CH₂)₄CH₃ phenyl substituent, HO, O, NH₂ | Blue |
| 2 | H₂N, O, OH, anthraquinone with –O–(CH₂)₆CH₃ phenyl substituent, HO, O, NH₂ | Blue |
| 3 | H₂N, O, OH, anthraquinone with –O–cyclohexyl phenyl substituent, HO, O, NH₂ | Blue |
| 4 | H₂N, O, OH, anthraquinone with –O–(CH₂)₈CH₃ phenyl substituent, HO, O, NH₂ | Blue |
| 5 | H₂N, O, OH, anthraquinone with –O–(CH₂)₃CH₃ phenyl substituent, HO, O, NH₂ | Blue |
| 6 | H₂N, O, OH, anthraquinone with –O–(CH₂)₇CH₃ phenyl substituent, HO, O, NH₂ | Blue |

TABLE 1-continued
| Dye No. | Structural formula | Color in toluene solution |
|---|---|---|
| 7 | 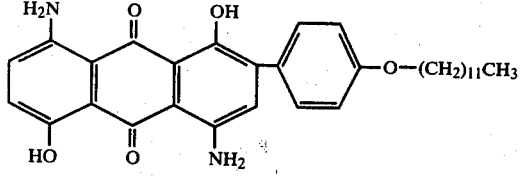 | Blue |
| 8 | 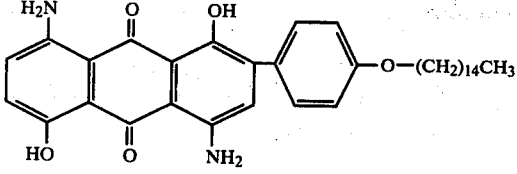 | Blue |
| 9 | 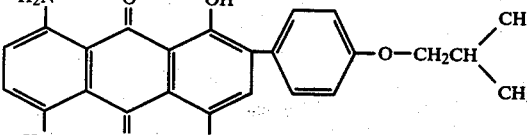 | Blue |
| 10 | 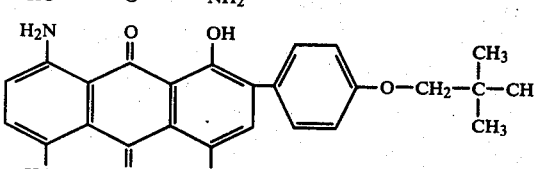 | Blue |
| 11 | 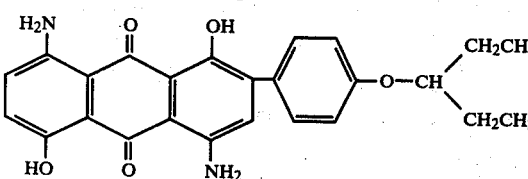 | Blue |
| 12 | 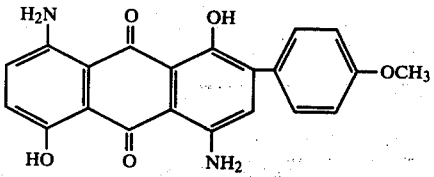 | Blue |
| 13 | 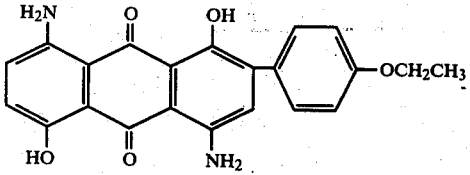 | Blue |
| 14 | 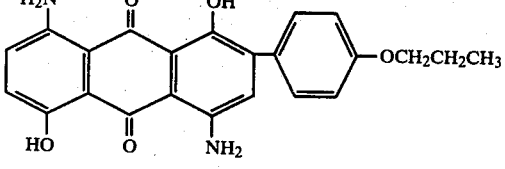 | Blue |
| 15 | 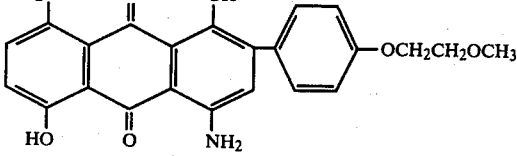 | Blue |

TABLE 1-continued
| Dye No. | Structural formula | Color in toluene solution |
|---|---|---|
| 16 | 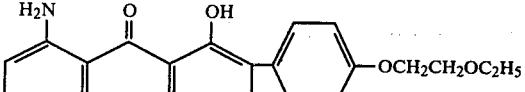 | Blue |
| 17 | 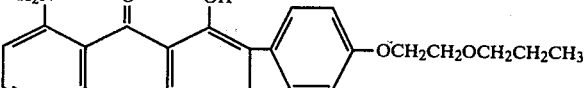 | Blue |
| 18 | 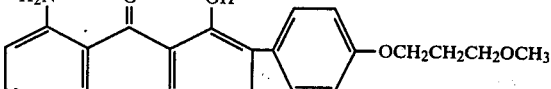 | Blue |
| 19 | 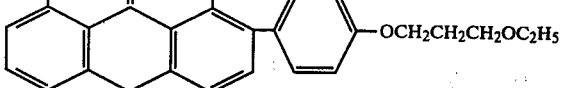 | Blue |
| 20 |  | Blue |
| 21 | 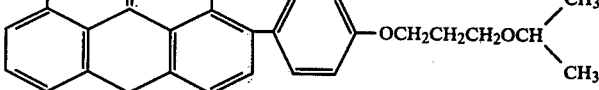 | Blue |
TABLE 2
| Dye No. | Structural formula | Color in chloroform |
|---|---|---|
| 22 | 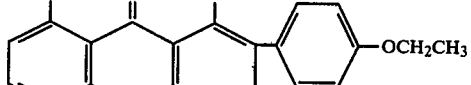 | Red |
| 23 | 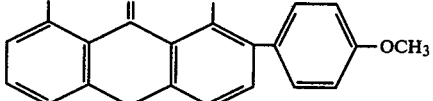 | Red |
| 24 | 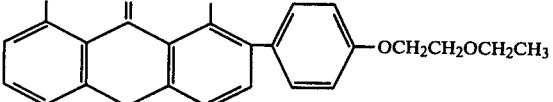 | Red |

TABLE 2-continued

| Dye No. | Structural formula | Color in chloroform |
|---|---|---|
| 25 | 1,4,5,8-tetrahydroxy-anthraquinone with 4-(3-methoxypropoxy)phenyl substituent: —C$_6$H$_4$—OCH$_2$CH$_2$CH$_2$OCH$_3$ | Red |
| 26 | tetrahydroxyanthraquinone with —C$_6$H$_4$—O—CH$_2$CH$_2$—O—(CH$_2$)$_7$CH$_3$ | Red |
| 27 | tetrahydroxyanthraquinone with —C$_6$H$_4$—O—(CH$_2$)$_3$—O—(CH$_2$)$_8$CH$_3$ | Red |
| 28 | tetrahydroxyanthraquinone with —C$_6$H$_4$—O—(CH$_2$)$_3$CH$_3$ | Red |
| 29 | tetrahydroxyanthraquinone with —C$_6$H$_4$—O—(CH$_2$)$_6$CH$_3$ | Red |
| 30 | tetrahydroxyanthraquinone with —C$_6$H$_4$—O—(CH$_2$)$_8$CH$_3$ | Red |
| 31 | tetrahydroxyanthraquinone with —C$_6$H$_4$—O—(CH$_2$)$_{14}$CH$_3$ | Red |
| 32 | tetrahydroxyanthraquinone with —C$_6$H$_4$—O—CH$_2$CH(CH$_3$)$_2$ (isobutoxy) | Red |
| 33 | tetrahydroxyanthraquinone with —C$_6$H$_4$—O—CH$_2$—C(CH$_3$)$_2$—CH$_2$CH(CH$_3$)$_2$ | Red |

TABLE 2-continued

| Dye No. | Structural formula | Color in chloroform |
|---|---|---|
| 34 | 1,5-dihydroxy-4,8-dihydroxy anthraquinone with 4-(1-propylbutoxy)phenyl substituent | Red |

The present invention is further described with reference to the drawings.

Figure 2:
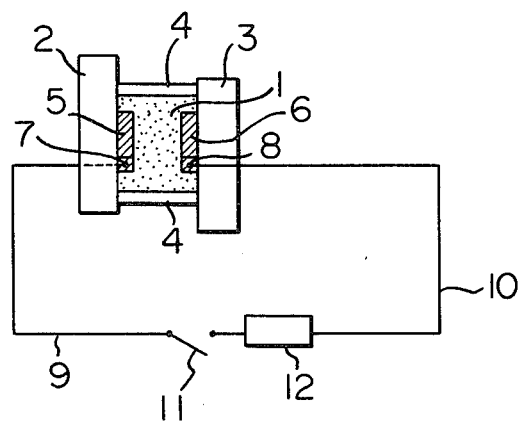

FIG. 1 is a front elevation of a liquid crystal display device incorporating the composition of this invention; and FIG. 2 is a cross-sectional view taken along the line a-a of FIG. 1.

Referring to the drawings, a nematic liquid crystalline substance colored with a dye is filled in a layer 1 interposed between two parallel-laid glass slides 2 and 3. The glass slides 2 and 3 are spaced from each other by spacers 4 defining both side ends of the layer 1. The slides 2 and 3 respectively have on their inner surfaces transparent electrodes 5 and 6. The electrode 5 is connected to an external lead wire 9 through a contact 7. Likewise, the electrode 6 is connected to an exterior lead wire 10 through a contact 8. The electrodes 5 and 6 are of rectangular shape and are disposed face-to-face to each other. A voltage source 12 and a switch 11 connected thereto in series are connected between the exterior lead wires 9 and 10. The voltage source 12 supplies a dc voltage or an ac voltage of low frequency sufficient to re-orient the liquid crystal molecules and dichroic dye molecules in the layer 1 and align them on the inner surfaces of the slides 2 and 3. Usually, voltages of 10 to 20 volts are sufficient.

An example of the nematic liquid crystal used in this invention is a mixture composed of 43% of 4-cyano-4'-n-pentyl biphenyl, 17% of 4-cyano-4'-n-propoxy biphenyl, 13% of 4-cyano-4'-n-pentoxy biphenyl, 17% of 4-cyano-4'-n-octoxy biphenyl, and 10% of 4-cyano-4'-n-pentyl terphenyl. There can also be used a so-called chiral nematic liquid crystal mixture obtained by adding 5% of cholesteryl nonanoate, 3% of optically active 4-cyano-4'-isopentyl biphenyl, etc. to the aforesaid mixture. This nematic liquid crystal mixture is in the cholesteric phase in the absence of electric voltage, but phase transition to the nematic phase occurs upon the application of voltage.

In addition to the above examples, biphenyl-type liquid crystals, phenyl cyclohexane-type liquid crystals, Schiff base-type liquid crystals, ester-type liquid crystals, pyrimidine-type liquid crystals, tetrazine-type liquid crystals, and other nematic liquid crystals exhibiting positive or negative dielectric anisotropy can be used as the nematic liquid crystals in this invention either singly or as mixtures.

The dichroic dyes in accordance with this invention are used either singly or as mixtures. The concentration of the dichroic dye in the liquid crystalline substance is such that the dye dissolves in the liquid crystals, and the dye molecules can be fully oriented and aligned by the orientation of the liquid crystal molecules. Generally, the suitable concentration of the dye is 0.01 to 20% by weight, preferably 0.01 to 3% by weight, based on the liquid crystalline substance. It is also possible to obtain the desired color hue by mixing the dichroic dye in accordance with this invention with another dichroic or non-dichroic dye or colorant.

In the making of such a liquid crystal display device, transparent electrodes are treated in advance so that the liquid crystal molecules and the dichroic dye molecules may be oriented parallel or perpendicular to the surfaces of transparent electrodes. The treatment can be performed, for example, by a method comprising simply rubbing the surfaces of the transparent electrodes with a cotton cloth, etc. in a fixed direction, a method comprising coating a silane-type compound, a method comprising vapor deposition of silicon oxide, or a method comprising coating a silane-type compound or depositing a vapor of silicon oxide, and then rubbing the surfaces of the transparent electrodes with a cotton cloth, etc. in a fixed direction.

When a solution consisting of nematic liquid crystals having positive dielectric anisotropy and the dichroic dye in accordance with this invention is filled in a liquid crystal color display device which has been treated so that the liquid crystals and dye molecules may be oriented parallel to the surfaces of transparent electrodes, the display device is of the type wherein the blue or red color of the electrode portions disappears upon the application of voltage.

When a solution consisting of nematic liquid crystals having negative dielectric anisotropy and the dichroic dye in accordance with this invention is filled in a liquid color display device which has been treated so that the liquid crystal and dye molecules may be oriented perpendicular to the surfaces of transparent electrodes, the display device is of the type wherein the electrode portions are colored blue or red upon the application of voltage.

The display devices shown in FIGS. 1 and 2 are of the type which permits viewing of transmitted light. These devices may become reflective-type display devices if the glass slide 2 is replaced by a non-transparent reflecting plate, or by placing a reflective plate rearwardly of the slide 2 to permit viewing from ahead of the glass slide 3.

There are a diversity of liquid crystals and methods available in constructing liquid crystal color display devices using the dichroic dyes in accordance with this invention. Essentially, all of them can be classified as displaying methods based on a guest-host mode utilizing the electro-optical effect of nematic liquid crystals.

The following typical Examples illustrate the present invention specifically. The invention, however, is not limited to these Examples. All percentages in these Examples are by weight.

EXAMPLE 1

Twenty-five grams of 1,5-dihydroxy-4,8-dinitroanthraquinone was dissolved at 20° C. in a solution of 600 g of conc. sulfuric acid and 48 g of boric acid. The solution was cooled to −15° C., and 18 g of n-nonyl phenyl ether was added dropwise over 30 minutes. The mixture was vigorously stirred at −15° to −10° C. for 2 hours. The resulting reaction mixture was discharged onto crushed ice, and the discharged liquid was boiled for 2 hours with stirring. The product was allowed to cool to 30° C., and the precipitate was separated by filtration and washed with water. The filtration cake was dispersed in 300 ml of water and 200 ml of ethanol, and 30 g of a 70% aqueous solution of sodium hydrosulfide was added. The mixture was stirred for 4 hours under reflux to perform reduction. After distilling off a greater part of ethanol, the precipitate was separated by filtration, and washed with water. The filtration cake was dispersed in 500 ml of 10% aqueous hydrochloric acid, boiled for 30 minutes, filtered, washed with water, and dried. The dried crude dye was put into a Soxhlet extractor, and extracted with benzene. The extract was concentrated, and allowed to cool. The precipitate was separated by filtration, dried, dissolved in benzene, and purified by column chromatography on a column packed with silica gel (Wako Gel C-300, a trademark of Wako Jyunyaku Co., Ltd.). The eluates containing a major product were concentrated, and allowed to cool to afford 2 g of dark blue fine crystals. This product was identified as Dye No. 4 in Table 1 which showed the following elemental analysis values: C:71.2%, H:6.2%, N:5.4% (calculated values: C:71.3%, H:6.6%, N:5.7%).

EXAMPLE 2

The same reaction as in Example 1 was performed except that 16 g of n-octylphenyl ether was used instead of n-nonylphenylether. The crude product was recrystallized from benzene to afford dark violet crystals corresponding to dye No. 6 in Table 1. This product was a blue dye which showed a maximum absorption at a wavelength of 587 m$\mu$ and 627 m$\mu$ in toluene solution.

EXAMPLE 3

The same reaction as in Example 1 was performed except that 15 g of (4-heptyl)phenyl ether was used instead of n-nonylphenylether. The crude product was dissolved in benzene, and passed through a column packed with silica gel powder. The resulting blue solution was evaporated to dryness to afford a dark blue powder corresponding to dye No. 11 in Table 1. This product was a blue dye which showed a maximum absorption at a wavelength of 587 m$\mu$ and 627 m$\mu$ in toluene solution.

EXAMPLE 4

Boric acid (16 g) and 50 g of Alizarin Saphirol B were added to 500 g of 95% sulfuric acid, and the mixture was stirred for 2 hours at 50° C. Then, 13 g of phenetol was added at 10° C., and the mixture was stirred for 2 hours. Then, 500 ml of water was added, and the mixture was stirred for 2 hours at 90° C. The precipitate was filtered, and the filter cake was dispersed in 1 liter of water. A 45% aqueous solution of sodium hydroxide was added dropwise to render the dispersion alkaline. At 80° C., 20 g of sodium hydrosulfite was added, and the reaction was performed for 1 hour. The reaction product was cooled, filtered, washed with water, and dried to afford 35 g of a crude product corresponding to dye No. 13 in Table 1. Recrystallization from ethanol afforded dark blue crystals corresponding to dye No. 13. This product was a dye which showed a maximum absorption at 627 m$\mu$ in toluene.

EXAMPLE 5

Boric acid (16 g) and 50 g of Alizarin Saphirol B were added to 500 g of 95% sulfuric acid, and the mixture was stirred at 50° C. for 2 hours. To the mixture was added 13 g of phenetol at 10° C., followed by stirring for 2 hours. Water (500 ml) was added, and the mixture was stirred at 90° C. for 2 hours. The precipitate was filtered, and the filtration cake was dispersed in 1 liter of water. Then, 250 g of a 45% aqueous solution of sodium hydroxide was added, and the mixture was heated to 98° C. 105 g of sodium hydrosulfite (purity 86%) was quickly added, and the reaction was performed at 104° C. for 30 minutes. The reaction mixture was cooled to 50° C., and sodium chloride was added. The precipitate was filtered, and the filtration cake was washed with 2% sodium chloride solution. The filtration cake was then put into 500 ml of 10% sulfuric acid, and stirred at room temperature for 1 hour, filtered, washed with water, and dried at 50° C. under reduced pressure to afford 28 g of a leuco derivative. Oxidation of this product with hydrogen peroxide in a customary manner afforded 27 g of a crude product. The crude product was purified by column chromatography on a chloroform-silica gel system to afford dark violet crystals corresponding to dye No. 22. This product was a red dye which had a melting point of 249° to 251° C. and showed a maximum absorption at 538 m$\mu$ in chloroform solution.

EXAMPLE 6

In a display device of the type shown in FIGS. 1 and 2, Silicone KF-99 (a trademark of Shin-etsu Chemical Co., Ltd., for a silicone compound) was coated on the surfaces of transparent electrodes 5 and 6. The layer 1 of this display element was filled with a colored liquid crystal solution composed of 0.1 part by weight of dye No. 4 prepared in Example 1 and 9.9 parts by weight of a liquid crystal mixture composed of 38% of 4-cyano-4'-n-pentyl biphenyl, 8% of 4-cyano-4'-n-pentoxy biphenyl, 23% of 4-cyano-4'-n-heptyl biphenyl, 8% of 4-cyano-4'-heptoxy biphenyl, 10% of 4-cyano-4'-n-octoxy biphenyl, 10% of 4-cyano-4'-n-pentyl terpenphenyl and 3% of optically active 4-cyano-4'-isopentyl biphenyl. A plastic film having a thickness of 10 $\mu$m was used as spacer 4.

When the switch 11 was opened, this display device was seen to be colored distinctly blue. When the switch 11 was closed and an ac voltage of 10 V at 32 Hz was applied, that portion of the device at which the transparent electrodes 5 and 6 faced each other became colorless. When the switch 11 was opened, a blue colored state was again shown. When the above display device was placed in the light path of a spectrophotometer, the maximum absorption wavelenth was 641 m$\mu$. When the switch 11 was opened and closed at this wavelength, the ratio of absorbance was 1:11 showing good dichroism.

When this display device was subjected to irradiation of visible light having a wavelength of more than 400 m$\mu$ for a long period of time, no change was noted in color hue, the ratio of absorbance, etc., and the display device retained the same properties as it had immediately after construction.

EXAMPLE 7

In a display device of the type shown in FIGS. 1 and 2, Silicone KF-99 was coated on the surfaces of transparent electrodes 5 and 6. The layer 1 of this display element was filled with a colored liquid crystal solution consisting of 0.1 part by weight of dye No. 15 and 9.9 parts by weight of a liquid crystal mixture composed of 38% of 4-cyano-4'-n-pentyl biphenyl, 8% of 4-cyano-4'-n-pentoxy biphenyl, 23% of 4-cyano-4'-n-heptyl biphenyl, 8% of 4-cyano-4'-heptoxy biphenyl, 4-cyano-4'-n-octoxy biphenyl, 10% of 4-cyano-4'-n-pentyl terphenyl and 3% of optically active 4-cyano-4'-isopentyl biphenyl. A plastic film having a thickness of 10 μm was used as spacer 4.

When the switch 11 was opened, this display device was seen to be colored distinctly blue. When the switch 11 was closed and an ac voltage of 20 V at 60 Hz was applied, that portion of the device at which the transparent electrodes 5 and 6 faced each other became almost colorless. When the switch 11 was opened, a blue colored state was again shown. When the above display device was placed in the light path of a spectrophotometer, the maximum absorption wavelength was 640 mμ. When the switch 11 was opened and closed at this wavelength, the ratio of absorbance was 1:7 showing good dichroism.

When this display device was subjected to irradiation of visible light having a wavelength of more than 400 mμ for a long period of time, no change was noted in color hue, the ratio of absorbance, etc., and the display device retained the same properties as it was immediately after construction.

EXAMPLE 8

In a display device of the type shown in FIGS. 1 and 2, Silicone KF-99 was coated on the surfaces of transparent electrodes. The layer 1 of this display element was filled with a colored liquid crystal solution consisting of 0.1 part by weight of dye No. 29 and 9.9 parts by weight of a liquid crystal mixture composed of 38% of 4-cyano-4'-n-pentyl biphenyl, 8% of 4-cyano-4'-n-pentoxy biphenyl, 23% of 4-cyano-4'-n-heptyl biphenyl, 8% of 4-cyano-4'-heptoxy biphenyl, 10% of 4-cyano-4'-n-octoxy biphenyl, 10% of 4-cyano-4'-n-pentyl terphenyl and 3% of optical rotatory 4-cyano-4'-isopentyl biphenyl. A plastic film having a thickness of 10 μm was used as spacer 4.

When the switch 11 was opened, this display device was seen to be colored distinctly red. When the switch 11 was closed and an ac voltage of 20 V at 60 Hz was applied, that portion of the device at which the transparent electrodes 5 and 6 faced each other became almost colorless. When the switch 11 was opened, a red colored state was again brought about. When the above display device was placed in the light path of a spectrophotometer, the maximum absorption wavelength was 544 mμ. When the switch 11 was opened and closed at this wavelength, the ratio of absorbance was 1:7 showing good dichroism.

When this display device was subjected to irradiation of visible light having a wavelength of more than 400 mμ for a long period of time, no change was noted in color hue, the ratio of absorbance, etc., and the display device retained the same properties as it was immediately after construction.

EXAMPLE 9

A display device was made in the same way as in Example 8 except that Dye No. 16 was used instead of Dye No. 29.

This display device showed a maximum absorption at a wavelength of 640 mμ, and an absorbance ratio of 1:8.

What we claim is:

1. A composition for nematic liquid crystal color display elements, said composition comprising at least one nematic liquid crystal and at least one anthraquinonic dye represented by the formula

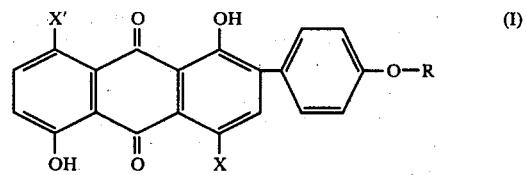

wherein X and X' are the same and represent —NH$_2$ or —OH, and R represents a linear or branched alkyl group having 1 to 15 carbon atoms, a cyclohexyl group or a group of the formula —R$_2$—O—R$_3$ in which R$_2$ is an alkylene group having 1 to 3 carbon atoms and R$_3$ is a linear or branched alkyl group having 1 to 15 carbon atoms, said anthraquinone dye being dissolved in the nematic liquid crystal.

2. The composition of claim 1 wherein said anthraquinonic dye is expressed by the following formula

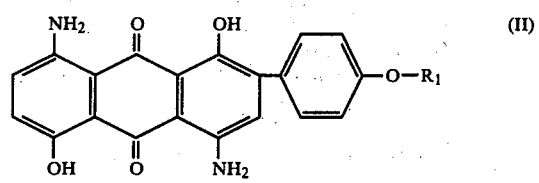

wherein R$_1$ represents a linear or branched alkyl group having 5 to 15 carbon atoms.

3. The composition of claim 1 or 2 wherein a mixture of said anthraquinonic dyes is dissolved in at least one nematic liquid crystal.

4. The composition of claim 1 or 2 wherein a mixture of said anthraquinonic dyes is dissolved in a mixture of nematic liquid crystals.

5. The composition of claim 1 or 2 wherein the concentration of said anthraquinonic dye is 0.01 to 20 percent by weight based upon the weight of the nematic liquid crystal.

6. The composition of claim 5 wherein said concentration is 0.01 to 3 percent by weight based on the weight of the nematic liquid crystal.

7. The composition of claim 1 or 2 wherein said nematic liquid crystal has a positive dielectric anisotropy.

8. The composition of claim 1 or 2 wherein said nematic liquid crystal has negative dielectric anisotropy.

* * * * *